Feb. 25, 1941.   A. J. PENICK ET AL   2,232,884
CASING AND TUBING HEAD ASSEMBLY
Filed Sept. 27, 1937

Inventors
Arthur J. Penick
Kirby T. Penick
By
Edward V. Hardway
Attorney

Patented Feb. 25, 1941

2,232,884

UNITED STATES PATENT OFFICE 2,232,884

CASING AND TUBING HEAD ASSEMBLY

Arthur J. Penick and Kirby T. Penick, Houston, Tex.

Application September 27, 1937, Serial No. 165,845

3 Claims. (Cl. 285—22)

This invention relates to a casing and tubing head assembly.

An object of the invention is to provide an assembly of the character described having means for supporting an inner tubing in the outer casing and for forming and maintaining a seal between the outer casing and the inner tubing.

It is another object of the invention to provide an assembly of the character described embodying a construction whereby the inner tubing may be supported on a packing assembly to maintain a fluid tight seal between the tubing and the casing with additional packing means above the tubing suspending means whereby an additional seal may be constantly maintained in case a leak should develop past the packing which sustains the tubing.

With the above and other objects in view, the invention has particular relation to certain novel features of construction, arrangement of parts and use, an example of which is given in this specification and illustrated in the accompanying drawing, wherein.

Figure 1:
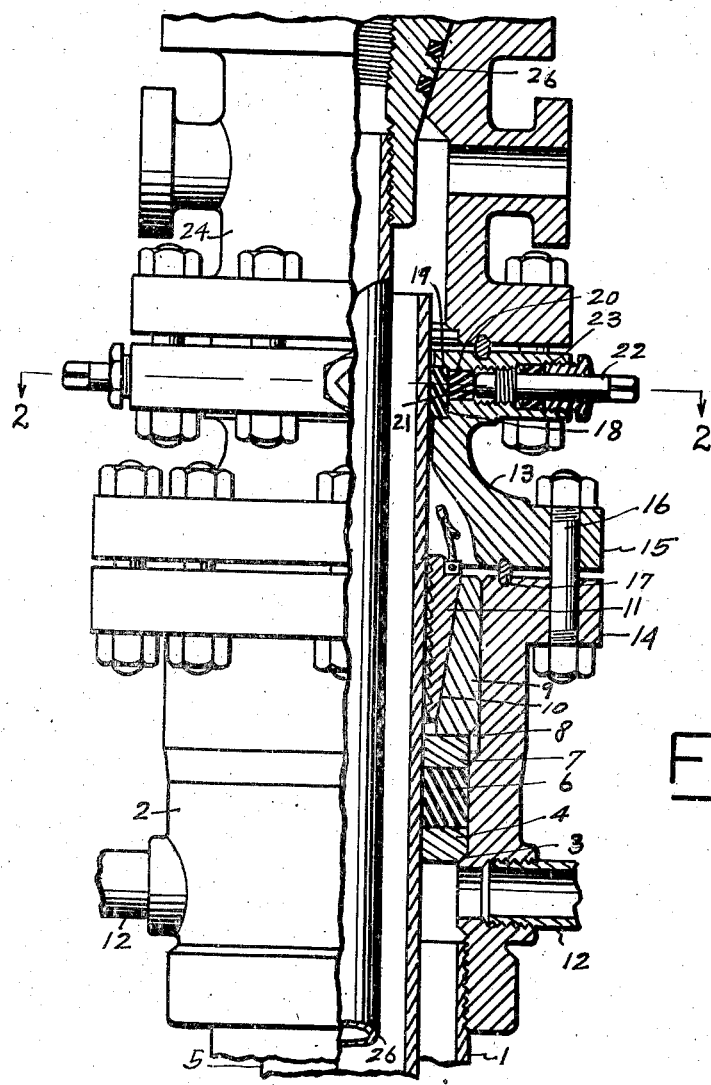
Figure 1 shows a side elevation of the assembly shown partly in section.
Figure 2:
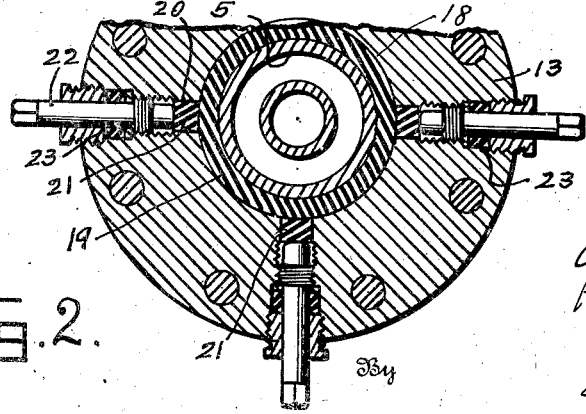
Figure 2 shows a fragmentary cross sectional view taken on the line 2—2 of Figure 1.

In the drawing the numeral 1 designates the well casing to the upper end of which the casing head 2 is attached. The casing head has an inside annular seat 3 whereon there is seated the metal ring 4. This ring surrounds the inner tubing 5 and on it there is the packing ring 6 which also surrounds the tubing and on the packing ring 6 there is an upper metal ring 7 around the tubing. Above the packing assembly 4, 6, 7, the head 2 is formed with the counterbore 8 in which there is the slip bowl 9 which rests on the ring 7 and which has the inside downwardly converging seat 10 to receive the wedge shaped slips 11 whose inner sides are toothed to grip and support the tubing 5.

Beneath the seat 3 there are the lateral flow lines 12, 12 leading out from the head. The weight of the tubing 5 is consequently sustained on the packing assembly 4, 6, 7 and the packing 6 is thus compressed to form a fluid tight seal with the inner tubing 5 and the casing head 2. On the casing head there is an adapter 13, said casing head and adapter having the registering flanges 14, 15 to receive the bolts 16, whereby these parts are secured together and the joint between them is broken by the gasket 17 to form a fluid tight seal. The tubing 5 extends above the tubing supporting slips 11 and the inside diameter of the upper end of the adapter is reduced to closely surround the tubing. The reduced upper end of the adapter has an inside annular groove 18 to receive an annular packing 19 which fits closely around the tubing 5. Leading outwardly from the groove 18 are the radial bores 20 which contain reserve supplies 21 of packing. Threaded into the bores 20 are the jack screws 22, whose inner ends are blank and work against the reserve supplies 21 of packing. Surrounding the outer ends of the jack screws 22, and mounted in the adapter 13, are the stuffing boxes 23.

In case a leak should develop past the packing 6, as will occur in the course of time, the packing 19 will still maintain the seal and if necessary, from time to time, the jack screws 22 may be tightened up against the packing 21, causing it to flow into the groove 18 to supplement the packing 19 in said groove so as to form a complete seal between the adapter 13 and the inner tubing 5.

The tubing head 24 may be mounted in any conventional manner on the adapter 13 for the purpose of supporting the inner tubing 25 from the hanger 26 mounted in the tubing head.

The drawing and description disclose what is now considered to be a preferred form of the invention by way of illustration only, while the broad principle of the invention will be defined by the appended claims.

What we claim is:

1. In combination a tubular head member having an inside seat, an inner pipe supported in said head member, annular resilient, flexible sealing means in the seat surrounding and fitting closely against the inner pipe, said head member having a radial bore therethrough which communicates with the seat, a reserve supply of sealing means in said bore, a jack screw having a threaded connection with the bore and whose inner end is arranged opposite said reserve supply to apply pressure thereto inwardly, upon inward movement of the jack screw whereby the material of the reserve supply will be caused to flow into the seat to compress the sealing means in the seat and replenish the sealing means displaced from the seat by wear.

2. In combination a tubular head member having a passageway therethrough and an inside annular seat formed in the wall of the passageway, an inside pipe positioned in the passageway close to the wall of the passageway adjacent the seat, said member having a radial cylindrical bore therethrough which communicates with the seat, annular resilient deformable packing material filling the seat and partially filling the bore, means for exerting a compressive force on the packing in the bore to place the packing material in the seat under compression, solely by fluid pressure exerted by the material in said bore, to form a seal between the pipe and seat around the pipe.

3. In combination a tubular head member having a passageway therethrough and an inside countersunk seat formed in the wall of the passageway, an inside pipe positioned in the passageway close to the wall of the passageway adjacent the seat, said member having a cylindrical radial bore therethrough which communicates with the seat, a resilient deformable packing material filling the seat and partially filling the bore, means for exerting a compressive force on the packing in the bore to place the packing material in the seat under compression, solely by fluid pressure exerted by the material in said bore, to form a seal between the pipe and seat, said means including a jack screw having a threaded connection with the bore and whose inner end is arranged opposite the packing material to apply pressure thereto inwardly, upon inward movement of the jack screw.

ARTHUR J. PENICK.
KIRBY T. PENICK.